United States Patent [19]  [11] 3,800,514
Avondoglio et al.  [45] Apr. 2, 1974

[54] FILTER FOR REMOVING PARTICLES AND AEROSOLS FROM AIR AND OTHER GASES

[76] Inventors: Leo Avondoglio, 10 Acorn Pl., North Caldwell, N.J. 07006; George N. Shuhan, 7 Willow St., Cranford, N.J. 07016

[22] Filed: Apr. 12, 1971

[21] Appl. No.: 133,127

[52] U.S. Cl............... 55/319, 55/400, 55/466, 55/486, 55/491, 55/DIG. 25
[51] Int. Cl............................................. B01d 33/02
[58] Field of Search ........................... 55/400–406, 55/337, 97, 319, 486, 491, 321, 323, DIG. 25, 466

[56] References Cited
UNITED STATES PATENTS

| | | | |
|---|---|---|---|
| 2,661,076 | 12/1953 | Walker | 55/DIG. 25 |
| 2,970,671 | 2/1961 | Warner | 55/DIG. 25 |
| 3,260,039 | 7/1966 | Brown et al. | 55/403 |
| 3,289,397 | 12/1966 | Schonewald et al. | 55/400 |
| 3,308,610 | 3/1967 | Springer et al. | 55/471 |
| 3,385,573 | 3/1968 | Gilman | 55/405 |
| 3,394,533 | 7/1968 | Shengli et al. | 55/337 |
| 3,588,288 | 6/1971 | Patter et al. | 55/337 |

*Primary Examiner*—Bernard Nozick

[57] ABSTRACT

An air filter is described of the centrifugal impact type having a casing defining an inlet adjacent the front end of a filter drum. The casing has a bulbous rear portion extending beyond the rear of the drum which has the air outlet and is shaped to enhance the efficiency of air flow through the filter.

5 Claims, 3 Drawing Figures

INVENTOR.
LEO AVONDOGLIO
AND GEORGE N. SHUHAN

BY

ATTORNEY

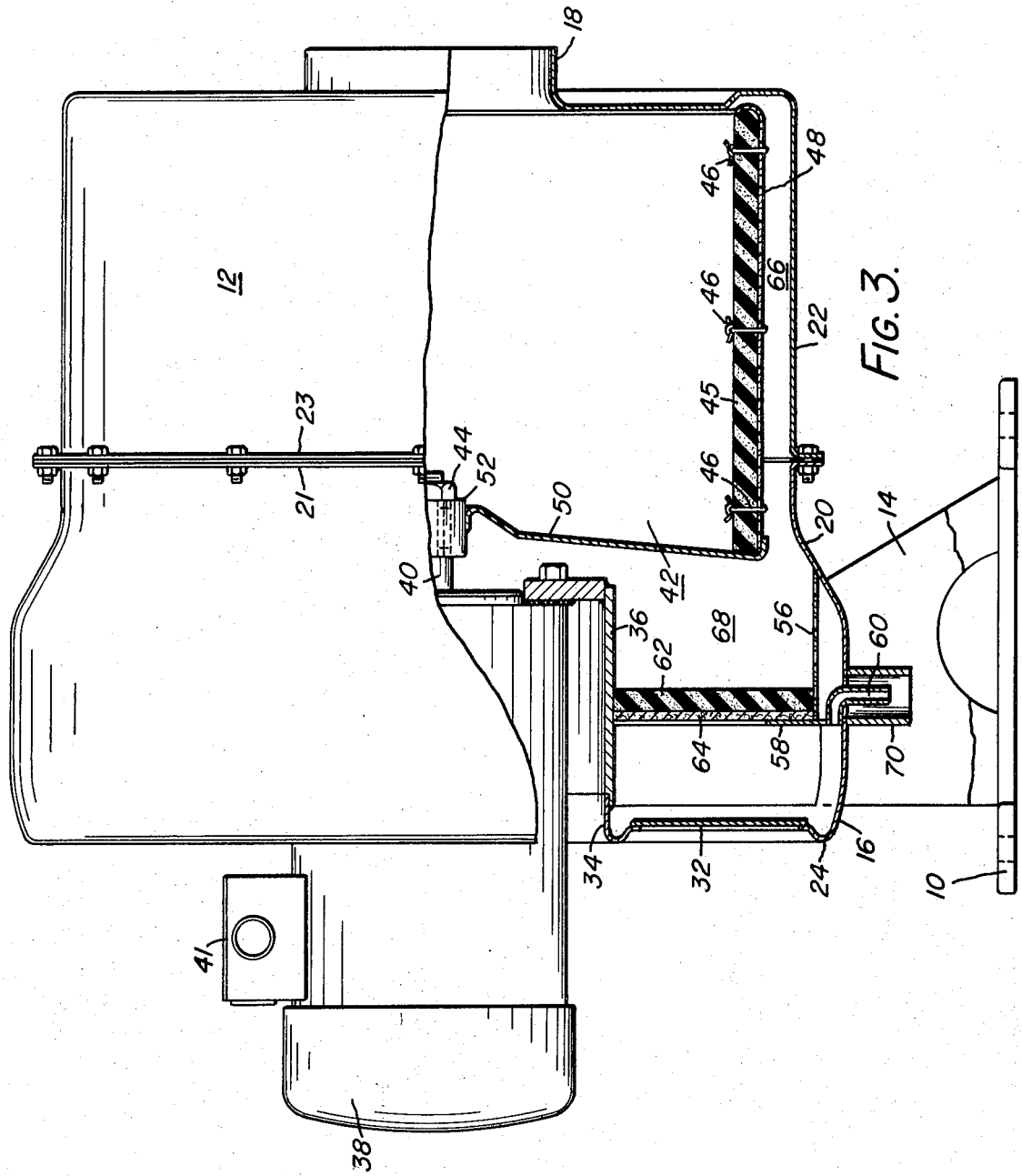

FILTER FOR REMOVING PARTICLES AND AEROSOLS FROM AIR AND OTHER GASES

This invention relates to filters and particularly to an improved centrifugal filter.

The invention is an improvement upon filters of the type described in U.S. Pat. No. 3,289,397 (Reissued as Re.26,927 on June 30, 1970.)

Whie filters of the type described in the above patent have been found eminently satisfactory in removing polutants from gaseous streams, it has become desirable to enhance their efficiency.

This has been accomplished in accordance with this invention by providing a casing for the rotating filter of foraminous material which has a bulbous portion at the rear of the drum. This bulbous rear portion enhances the flow, reduces pressure drop through the filter and permits easier removal of the residual polutants. Particularly, the velocity of the air or gas changes abruptly as it enters the bulbous rear portion thereby causing any particles and other polutants, which have not been filtered by the rotating filter, to drop from the gas or air stream. The filter is therefore more efficient and capable of greater polutant removal capacity.

It is a principal object of the invention to provide an improved filter of the centrifugal type.

It is a further object of the invention to provide an improved filter for aerosols and other particles and polutants having the above-mentioned advantages.

The invention itself, both as to its organization and method of operation, as well as additional objects and advantages thereof will become more readily apparent from a reading of the following description in connection with the accompanying drawings in which:

FIG. 3 is an elevational view of the same filter, the view being partially broken away to show the interior construction thereof.

Figure 1:
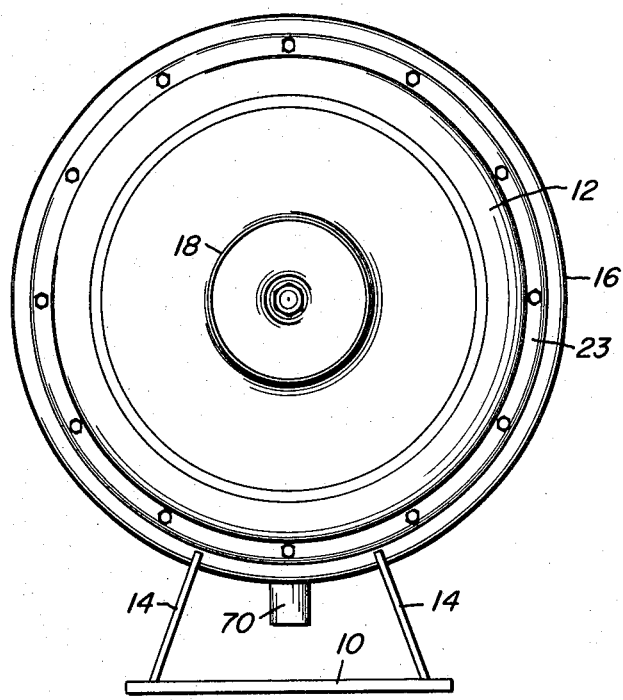
FIG. 1 is a front end view of a filter embodying the invention.
Figure 2:
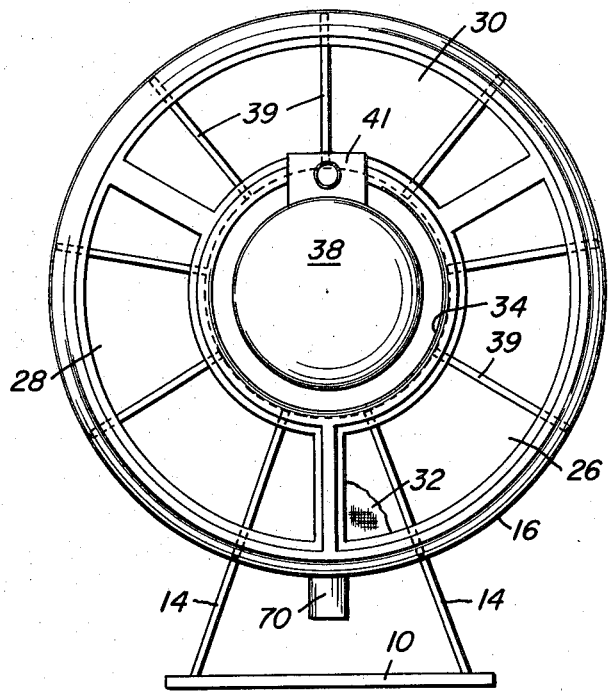
FIG. 2 is a rear end view of the same filter.

Referring to the drawings, there is shown a pedestal 10 upon which a casing 12 is mounted, as by welding the legs 14 of the pedestal to the rear portion 16 of the casing. The legs 14 also extend through the wall of the rear portion of the casing 16 up to a cylinder 36 whereat they are fastened as by welding. In addition, radial vanes 39 best shown in FIG. 2, extend between the casing 16 and the cylinder 36 where they provide structural rigidity to the assembly. The casing 12 itself is generally cylindrical in shape; the front end of the casing is closed except for a central neck 18, which has an opening. This neck provides an inlet to the filter. A vent or hose, say extending to a machine from the vicinity of which aerosols, particles or other polutants are to be removed may be fastened to the neck 18.

From the front end to a tapered section 20 of the casing, there extends the front portion 22 of the casing. Since the rear portion 16 is larger in a radial direction that the front portion, the rear is bulbous in shape.

It is a feature of the invention to provide a casing having the shape set forth above; this shape providing for the improved air flow and efficiency of operation of the invention. Any particles which are not removed in the front portion of the filter or any mist or aerosol which has coalesced into larger oil drops are subjected to an abrupt reduction in velocity as they enter the rear portion due to the large volume of the rear portion 68 as compared to the effective volume 66 in the front portion. This change in velocity causes the particles to drop to the walls of the rear portion 16 of the casing. The casing is in two parts for easy removal at opposing flanges 21 and 23 (between which a gasket can be placed) for servicing the filter.

The rear end 24 of the casing 12 has three sector shaped openings 26, 28, 30, which may be covered with a screen 32; these openings providing the air outlet for the filter.

A lip 34 on the rear end of the casing is welded to a cylinder 36 which is part of the casing rear end assembly; the cylinder supports the frame of an electric motor 38. The cylinder 36, the vanes 39 and the rear portion 16 of the casing together with the legs 14 of the pedestal 10 provide a unitary structure which rigidly supports the motor 38 and reduces vibration during operation. The shaft 40 of the motor is coaxial with the casing 12. A junction box 41 is provided for electrical connections to the motor 38.

A drum and filter assembly 42 is attached by a key and bolt 44 to the shaft 40. This assembly consists of a body 44 of foraminous filter material, e.g., polyurethane foam, which is a hollow cylinder. This filter body is attached by flexible plastic tie-wraps 46 (for easy removal of the filter body) and extend through a perforated tube 48 which is curved at its front end to provide a receptacle for the filter body 44.

The tube 48 is attached by a disc-like end plate 50 to a collar 52 which is keyed to the shaft 40; the end plate being welded at the collar 52 and the tube. The plate 50 also serves to close the rear end of the filter body.

A cylinder 56 of perforated sheet metal is located in the rear portion 16 of the casing 12. This perforated cylinder is welded between the tapered portion 20 of the casing and a ring 58 which extends radially upwardly from the outer wall of the rear portion 16 of the casing. A drain tube 60 for liquids extends through the casing into the region behind the ring 58.

Ahead of the disc 58 and extending radially across the rear portion 16 are two layers of filter material 62 and 64. The first 62 is desirably a foam material like the body 44. The second 64 may be metallic mesh or the like.

It is to be noted that the first volume 66 extends in the radial space between the filter drum assembly (viz., the tube 48) and the wall of the front portion of the casing. This first volume extends into a second volume 68 defined by the rear portion 16 of the casing. The second area is larger in radial dimensions than the first thereby affording the abrupt change in velocity for enhancing removal of coalesced aerosols and particles as mentioned above.

In operation air or gas flows from the inlet opening at the neck 18 to the outlet at the openings 26, 28 and 30. The air or gas spirals continuously through the filter body 44 as explained in the above referenced patents, thereby causing the removal of mists and particles in the front portion of the filter assembly. A small blower may be attached to the shaft to assist in distributing the flow if desired. The large second area 68 by virtue of the bulbous portion provides for the abrupt decrease in velocity, enhances the flow, decreases the pressure drop and the load on the motor. The perforated cylinder 56 also assists in rendering support, while not inhibiting either the gas (air) flow, while affording a region on which the coalesced particles can collect and then drop into the region near the mouth of the tube 60 into which the liquids may drain. A bottle or hose can easily be connected to the ring 70 around the tube 60.

Variations and modifications of the herein described filter, within the scope of the invention include different arrangements for support of the filter drum assembly 42, different means for disassembly of the casing for servicing, e.g., O-rings and wrap-around retainer rings, and tapering the rear end of the rear portion of the casing to accommodate different pedestals, say directly connected to the motor frame.

What is claimed is:

1. A centrifugal-type filter comprising: a casing having a front upstream wall portion of generally uniform cross-sectional area along its axial length and a rear downstream wall portion contiguous to said front portion and also of generally uniform cross-sectional area along its axial length greater than the cross-sectional area of said front portion, said front portion being spaced from and encompassing a rotatable filter assembly axially aligned and supported within said casing, said filter assembly including a hollow cylindrical body of foraminous filter material and a perforated tube contacting and forming a receptacle for said hollow cylindrical body, said perforated tube being closed at one end adjacent to said rear wall portion, means for rotating said receptacle so that gases entering the open end of said tube containing said foraminous filter material pass through the hollow cylindrical foraminous filter and the tube sidewall, said front wall portion of said casing and said filter assembly defining a first area therebetween which extends the length of said filter assembly, said front wall portion of said casing further including cover means covering the front end of the casing extending radially inwardly toward the axis of said casing and having an orifice therein defining an inlet positioned adjacent to and communicating with the open end of the filter assembly through which gases pass into the interior of said filter assembly; said rear wall portion of said casing extending axially beyond said filter assembly to form a downstream second area, said casing further including an outwardly flanged transitional wall portion and increasing cross-sectional between said front and rear wall portions of said casing and extending abruptly outwardly in a radial direction beyond the radial extremity of said front wall portion of said casing whereby said rear wall portion forms a bulbous end of said casing which causes a pressure drop in the gases passing through said casing, permits easier removal of residual pollutants and enhances gas flow through the filter assembly, said rear wall portion being further defined in that it terminates in an open end which forms an outlet for gases passing through said casing and further includes a discharge outlet in the rear wall portion for liquids separated from said gases.

2. The invention as set forth in claim 1 wherein said casing is generally cylindrical in shape.

3. The invention as set forth in claim 2 including a disc of foraminous filter material extending diametrically across said rear portion.

4. The invention as set forth in claim 2 including a perforated cylinder attached to said casing and housed within said rear portion and extending axially along a portion of the axial length of said rear portion of said casing said perforated cylinder affording a region in which the coalesced particles can collect and then pass out said discharge outlet.

5. The invention as set forth in claim 4 wherein the axial length of said perforated cylinder is less than the axial length of said rear portion of said casing, said perforated cylinder extending from said front portion partially in an axial direction across said rear portion, and a disc of filter material extending radially across said rear portion at the rear end of said perforated cylinder.

* * * * *

UNITED STATES PATENT OFFICE
CERTIFICATE OF CORRECTION

Patent No. 3,800,514            Dated April 2, 1974

Inventor(s)   Leo Avondoglio et al.

It is certified that error appears in the above-identified patent and that said Letters Patent are hereby corrected as shown below:

Column 4, line 4, "and" should read -- of --; line 5, after "cross-sectional" insert -- area --; line 17, "in" should read -- communicating with --; line 18, after "liquids" insert -- and particles --

Signed and sealed this 8th day of October 1974.

(SEAL)
Attest:

McCOY M. GIBSON JR.           C. MARSHALL DANN
Attesting Officer             Commissioner of Patents